United States Patent [19]

Eida et al.

[11] Patent Number: 5,213,614
[45] Date of Patent: May 25, 1993

[54] INK, INK JET RECORDING PROCESS AND RECORDING APPARATUS USING THE SAME

[75] Inventors: Tsuyoshi Eida, Yokohama; Mayumi Yamamoto, Tokyo; Takao Yamamoto, Isehara, all of Japan

[73] Assignee: Canon Kabushiki Kaisha, Tokyo, Japan

[21] Appl. No.: 822,106

[22] Filed: Jan. 17, 1992

[30] Foreign Application Priority Data

Jan. 18, 1991 [JP] Japan ................. 3-016825

[51] Int. Cl.$^5$ .............................. C09D 11/02
[52] U.S. Cl. .................. 106/22 K; 534/666; 534/667; 534/668; 534/679; 534/680; 534/810; 534/811; 534/812; 534/815; 346/1.1
[58] Field of Search .......... 106/22, 22 K; 534/666, 534/667, 668, 679, 680, 810, 811, 812, 815; 346/1.1

[56] References Cited

U.S. PATENT DOCUMENTS

| | | | |
|---|---|---|---|
| 1,852,032 | 4/1932 | Stüsser | 534/679 |
| 4,426,226 | 1/1984 | Ohta et al. | 106/22 |
| 4,557,761 | 12/1985 | Kobayashi et al. | 106/22 |
| 4,592,756 | 6/1986 | Kawasaki et al. | 106/22 |
| 4,661,158 | 4/1987 | Kobayashi et al. | 106/22 |
| 4,734,489 | 3/1988 | Kawasaki et al. | 106/22 |
| 4,765,838 | 8/1988 | Ohata et al. | 106/22 |
| 4,804,411 | 2/1989 | Eida et al. | 106/22 |
| 4,841,037 | 6/1989 | Ohta et al. | 106/22 |
| 4,864,324 | 9/1989 | Shirota et al. | 346/1.1 |
| 5,017,227 | 5/1991 | Koike et al. | 106/22 |
| 5,082,496 | 1/1992 | Yamamoto et al. | 106/22 |

OTHER PUBLICATIONS

Patent Abstracts of Japan, vol. 5, No. 16 (C-41) [688]; JP-A-55-144067 (Nov. 10, 1980) Jan. 30, 1981.

*Primary Examiner*—Mark L. Bell
*Assistant Examiner*—Helene Klemanski
*Attorney, Agent, or Firm*—Fitzpatrick, Cella, Harper & Scinto

[57] ABSTRACT

An ink comprising: water, a water soluble organic solvent, and a colorant represented by the following general formula (I):

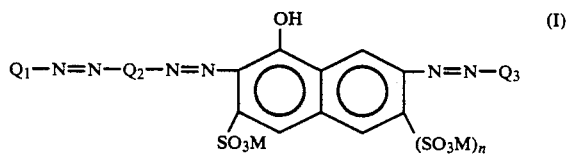

wherein Q1 is a substituted phenyl group; Q2 is a substituted or unsubstituted p-phenylene or a substituted or unsubstituted 1,4-naphtylene group; Q3 is a substituted phenyl group; M is an alkali metal, ammonium or an organic ammonium; and n is 0 or 1, and wherein said colorant has at least a sulfone group and a carboxyl group and the number of said sulfone groups is not greater than the number of said carboxyl groups. Such an ink may be used for an ink jet recording.

29 Claims, 3 Drawing Sheets

INK, INK JET RECORDING PROCESS AND RECORDING APPARATUS USING THE SAME

BACKGROUND OF THE INVENTION

1. Field of the Invention

The present invention relates to an ink, an ink jet recording process using the ink and a recording apparatus using the ink, and more particularly to an ink which provides a highly water-resistant image even on ordinary paper, and ian ink jet recording process and a recording apparatus using the ink.

2. description of the Related Art

A variety of inks having different compositions for ink jet recording have been reported. Recently, various aspects of ink have been studies and developed, such as in composition or properties, so that ink will provide fine recording even on ordinary paper, such as copying paper, notebook paper, letter paper, bond paper or continuous business paper, which is widely used in offices.

Water based ink, which is generally used in the ink jet recording, presents a problem. Since the coloring materials contained in such ink are water-soluble, the images recorded on recording media in such ink are likely to run, for example, due to moisture of hands or water-drops, resulting in blurred or unidentifiable images.

SUMMARY OF THE INVENTION

It is an object of the present invention to provide an ink which produces highly water-resisting images even on a variety of paper generally used, an ink jet recording process using the ink, and a recording apparatus using the ink.

To achieve the above objects, the present invention provides an ink comprising: water, a water soluble organic solvent, and a colorant represented by the following general formula (I):

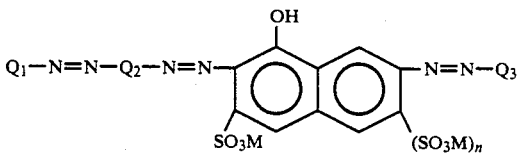

(I)

wherein $Q_1$ is a substituted phenyl group; $Q_2$ is a substituted or unsubstituted p-phenylene or a substituted or unsubstituted 1,4-napthylene group; $Q_3$ is a substituted phenyl group; M is an alkali metal, ammonium or an organic ammonium; and n is, 0 or 1, and wherein said colorant has at least a sulfonic acid group and a carboxyl group and the number of said sulfonic acid groups is not greater than the number of said carboxyl groups.

The present invention still also provides an ink jet recording process of conducting recording by ejecting droplets of an ink from an orifice in response to a recording signal, wherein the ink as described above is used.

The present invention further provides an ink jet device comprising an ink storing member impregnated with a recording liquid, and a head having an orifice for ejecting the recording liquid as droplets, wherein the ink as described above is used.

The present invention still further provides an ink jet recording apparatus comprising an ink jet device comprising an ink storing member impregnated with a recording liquid, and a head having an orifice for ejecting the recording liquid, wherein the ink as described above is used.

The present invention still further provides an ink cartridge comprising an ink bag impregnated with a recording liquid comprising an ink, wherein the ink as described above is used.

DESCRIPTION OF THE PREFERRED EMBODIMENTS

Figure 1A:
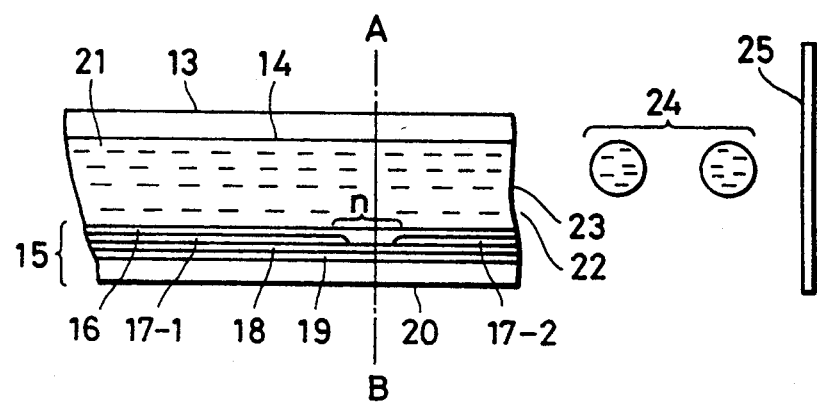
FIG. 1A and FIG. 1B illustrate a vertical cross section and a transverse cross section, respectively, of a head of an ink jet recording apparatus.

An ink that produces highly water-resistant images even on a variety of generally-used papers, an ink jet recording process using the ink and a recording apparatus using the ink can be provided by employing a coloring compound having a specific molecular structure as a coloring material of the ink.

The present invention will be described in detail hereinafter with reference to the preferred embodiments or examples.

A color employed in the present invention may be any compound that belongs to a compound group represented by the general formula illustrated above. An ink according to this invention may contain one or more of such compounds or may contain, besides such a compound, a compound which is not represented by the general formula. Preferably, in the general formula, the phenyl group of Q1 has at least one substituent selected from the group consisting of $NH_2$, $CH_3$, OH, Cl, $SO_3M$ and COOM (more preferably, a group consisting of $NH_2$, $CH_3$, OH, Cl and COOM); the substituted p-phenylene or the 1,4-naphthylene group of Q2 has at least one substituent selected from the group consisting of $CH_3$, $OCH_3$, $NHCOCH_3$, COOM and $SO_3M$; and the phenyl group of Q3 has at least one substituent selected from the group consisting of $NH_2$, $CH_3$, OH, $SO_3M$ and COOM (more preferably, a group consisting of $CH_2$, OH and COOM). The particularly preferred colors represented by the general formula are illustrated below:

(Compound No. 1)

-continued

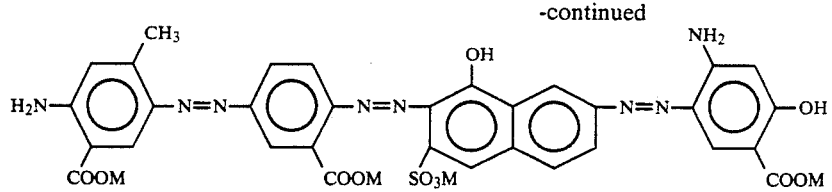

(Compound No. 2)

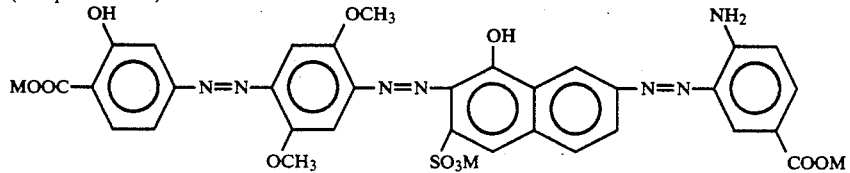

(Compound No. 3)

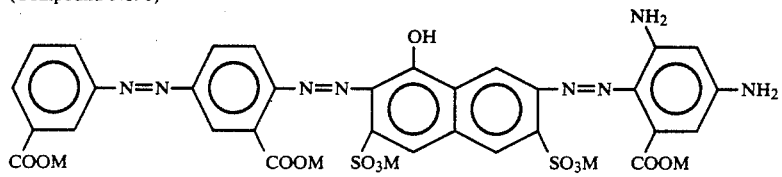

(Compound No. 4)

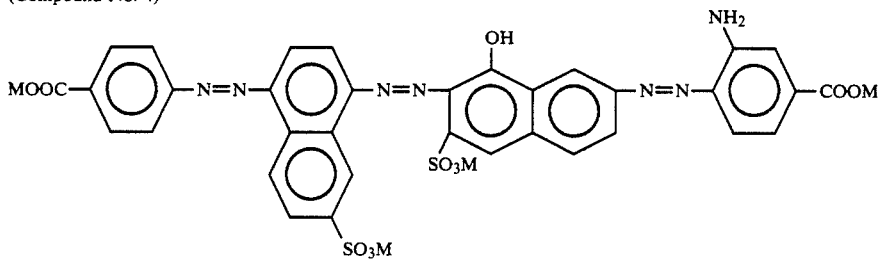

(Compound No. 5)

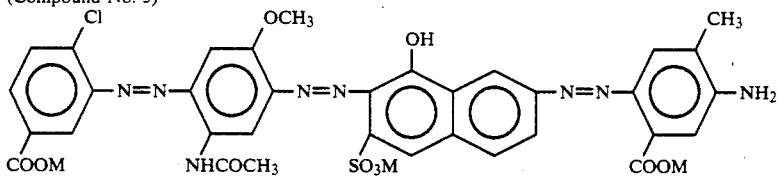

(Compound No. 6)

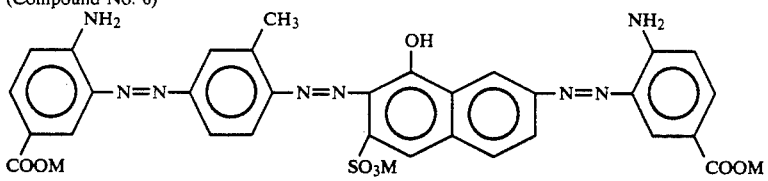

The amount of these coloring compounds to be contained in the ink is determined by the type of liquid composition, the desired properties of the ink, etc. In general, however, the amount is by weight 0.2 to 20%, preferably 0.5 to 10%, and more preferably 1 to 5% based on the total weight of the ink.

A liquid used in the present invention is a mixture of water and a water-soluble organic solvent. The water may preferably be deionized. The water-soluble organic solvent may be, for example, any of the following: alkyl alcohols having one to five carbons or their halogenated derivatives such as methyl alcohol, ethyl alcohol, n-propyl alcohol, isopropyl alcohol, n-butyl alcohol, sec-butyl alcohol, tert-butyl alcohol, isobutyl alcohol or n-pentanol; amides such as dimethylformamide or dimethylacetamide; ketones or ketoalcohols such as acetone or diacetone alcohol; ethers such as tetrahydrofuran or dioxan; addition polymerization products of oxyethylenes or oxypropylenes such as diethylene glycol, triethylene glycol, tetraetylene glycol, dipropylene glycol, tripropylene glycol or polyethylene glycol; alkylene glycols including alkylene groups having two to six carbons such as ethylene glycol, propylene glycol, trimethylene glycol, butylene glycol, 1,2,6-hexanetriol or hexylene glycol; thiodiglycol; glycerin; lower alkyl ethers of polyhydric alcohols such as ethylene glycol monomethyl(or ethyl) ether, diethylene glycol monomethyl(or ethyl) ether, triethylene glycol monomethyl(or ethyl) ether; lower dialkyl ethers of polyhydric alcohols such as triethylene glycol dimethyl(or ethyl)

ether or tetraethylene glycol dimethyl(or ethyl) ether; sulpholane, 2-pyrrolidone, N-methyl-2-pyrrolidone, 1,3-dimethyl-2-imidazolidinone.

The amount of the above water-soluble organic solvents contained in the ink is by weight 2 to 50%, preferably 2 to 30% based on the total weight of the ink. Only one of the above solvents or a mixture of two or more of the solvents may be contained in the ink.

Although the main constituents of an ink of the present invention are a coloring compound, water and a water-soluble organic solvent as described above, the ink may further contain a dispersing agent, a surface active agent, a viscosity regulating agent, a surface tension regulating agent, fluorescent whitening agent, etc. on condition that such agents do not obstruct the achievement of the object of the present invention. For example, the following may be added to the ink: a viscosity regulating agent such as polyvinyl alcohol, cellulose or water-soluble resin; a surface active agent of cation, anion or nonion type; a surface tension regulating agent such as diethanolamine or triethanolamine; a pH regulating agent in a buffer; and an anti-mildew agent.

In dispensation of an ink to be used in an ink jet recording process where the ink is electrically charged, an inorganic salt such as lithium chloride, ammonium chloride or sodium chloride may be added for regulating the specific resistance of the ink. An ink according to the present invention is suitable for an ink jet recording process where the ink is ejected by pressure generated by bubble formation in the ink caused by thermal energy. An ink of the present invention provides stable ejection of the ink and prevents occurrence of satellite dots when it is ejected onto a recording medium. In this case, the heat-related properties (e.g., specific heat, thermal expansion coefficient or thermal conductivity) of the ink may be regulated.

An ink of the present invention has, as its properties at 25° C., a surface tension of 30 to 68 dyne/cm and a viscosity of not greater than 15 cP, preferably 10 cP, and more preferably 5 cP, in order to solve problems of an image recorded on an ordinary kind of paper, such as bleeding of ink or low drying and permeating properties. Therefore, the amount of the water contained in the ink is by weight 50 to 95%, and preferably 60 to 90% based on the total weight of the ink.

The ink of the present invention, which is particularly suitable for an ink jet recording method for recording by ejecting ink droplets by thermal energy, is naturally useful also for general writing utensils.

Figure 1B:
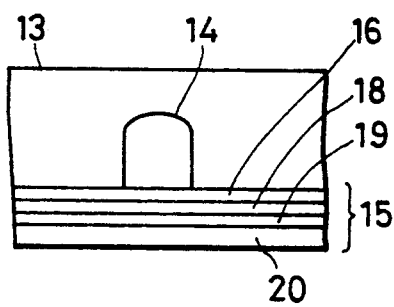
Figure 2:
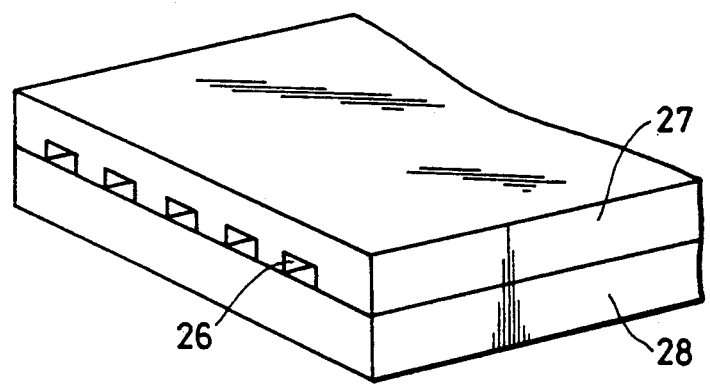
FIG. 2 is a perspective illustration of a head having a multiple set of the heads as shown in FIGS. 1A and 1B.

An example of the constitution of the heads, which is a main portion of the apparatus, is shown in FIG. 1A, FIG. 1B and FIG. 2.

A head 13 is formed by bonding a plate of glass, ceramics, or plastics having a groove 14 with a heat-generating head 15. (The type of the head is not limited to the one shown in the drawing.) The heat-generating head 15 is constituted of a protection layer 16 formed of silicon oxide or the like, aluminum electrodes 17-1 and 17-2, a heat-generating resistance layer 18 formed of nichrome or the like, a heat accumulation layer 19, and a substrate plate 20 having heat-releasing property made of alumina or the like.

Ink 21 reaches the ejection orifice 22 (a fine pore), forming a meniscus by action of pressure P not shown in the figure.

On application of an electric signal to the electrodes 17-1 and 17-2, the region designated by a symbol "n" on the heat-generation head 15 abruptly generates heat to form a bubble in the ink 21 at the position adjacent thereto. The pressure generated by the bubble pushes out the meniscus 23 and ejects the ink 21, as recording droplets 24, and the ink droplets are propelled to a recording medium 25. FIG. 2 illustrates the exterior appearance of a multi-head constructed by juxtaposing a multiplicity of heads shown in FIG. 1A. The multi-head is prepared by bonding a glass plate 27 having multi-grooves 26 with a heat-generation head 28 similar to the one described in FIG. 1A.

Incidentally, FIG. 1A is a cross-sectional view of the head 13 along an ink flow path, and FIG. 1B is a cross-sectional view of the head at the line A-B in FIG. 1A.

Figure 3:
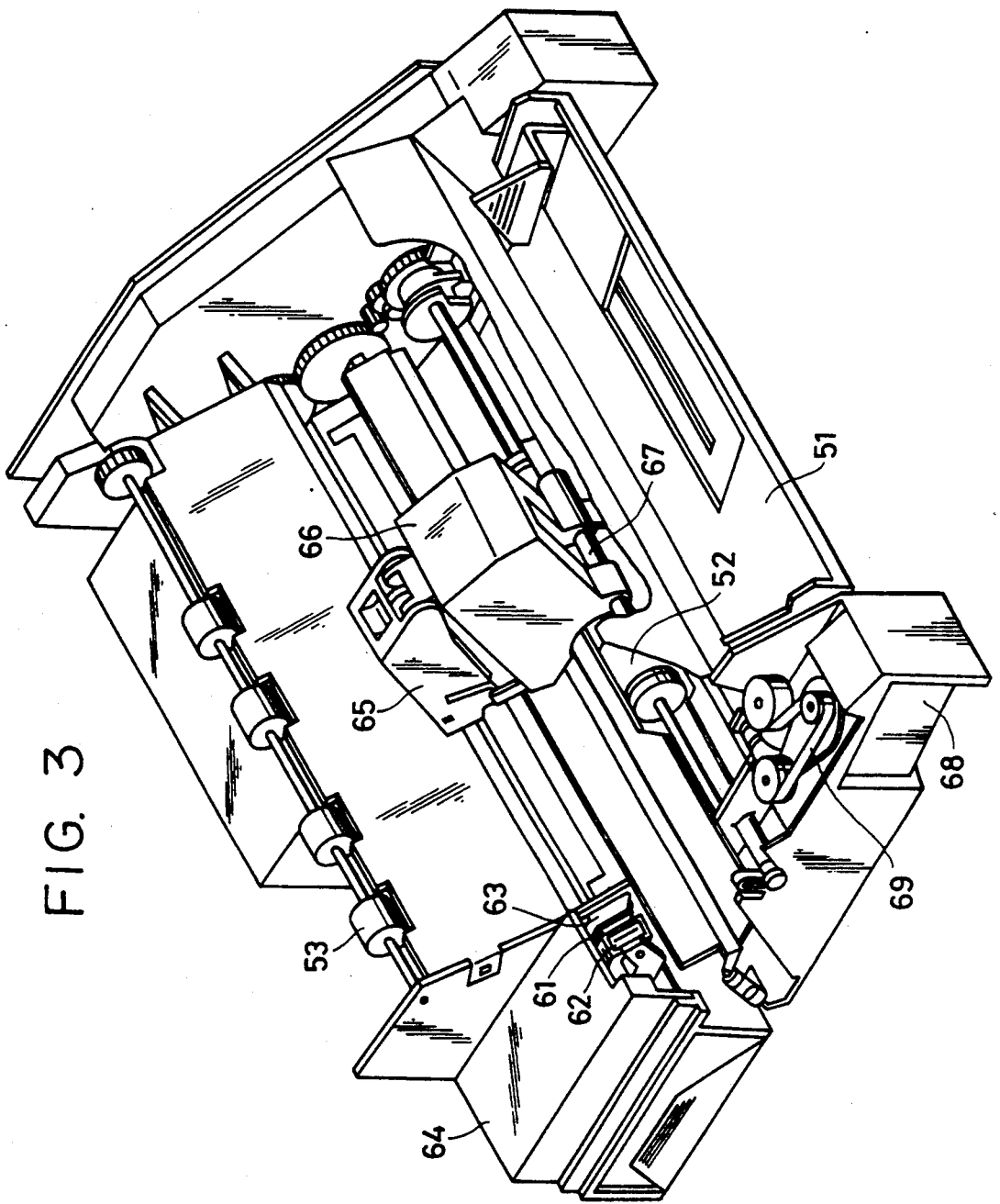
FIG. 3 is a perspective illustration of an example of an ink jet recording apparatus.

FIG. 3 illustrates an example of the ink-jet recording apparatus having such a head mounted therein.

In FIG. 3, a blade 61 as a wiping member is held at one end by a blade-holding member, forming a fixed end in a shape of a cantilever. The blade 61 is placed at a position adjacent to the recording region of the recording head, and in this example, is held so as to protrude into the moving path of the recording head. A cap 62 is placed at a home position adjacent to the blade 61, and is constituted such that it moves in the direction perpendicular to the moving direction of the recording head to come into contact with the ejection nozzle face to cap the nozzles. An ink absorption member 63 is provided at a position adjacent to the blade 61, and is held so as to protrude into the moving path of the recording head in a manner similar to that of the blade 61. The aforementioned blade 61, the cap 62, the absorption member 63 constitute an ejection-recovery section 64, the blade 61 and the absorption member 63 remove water, dust, and the like from the ink ejecting nozzle face.

A recording head 65 has an ejection energy generation means for ejection, and conducts recording by ejecting ink toward a recording medium opposing to the ejection nozzle face. A carriage 66 is provided for supporting and moving the recording head 65. The carriage 66 is engaged slidably with a guide rod 67. A portion of the carriage 66 is connected (not shown in the figure) to a belt 69 driven by a motor 68, so that the carriage 66 is movable along the guide rod 67 to the recording region of the recording head and the adjacent region thereto.

The constitution of a paper delivery portion 51 for delivery of a recording medium and a paper delivery roller 52 driven by a motor not shown in the figure delivers the recording medium to the position opposing to the ejecting nozzle face of the recording head, and the recording medium is discharged with the progress of the recording to a paper discharge portion provided with paper-discharge rollers 53.

In the above constitution, the cap 62 of the ejection-recovery portion 64 is out of the moving path of the recording head 65, while the blade 61 is made to protrude into the moving path. Therefore, the ejecting nozzle face of the recording head 65 is wiped therewith. The cap 62 moves to protrude toward the moving path of the recording head when the cap 62 comes into contact for capping with the ejecting nozzle face of the recording head.

At the time when the recording head 65 moves from the home position to the record-starting position, the cap 62 and the blade 61 are at the same position as in the above-mentioned wiping time, so that the ejection nozzle face of the recording head is wiped also in this movement.

The recording head moves to the home position not only at the end of the recording and at the time of ejection recovery, but also at a predetermined interval during movement for recording in the recording region. By such movement, the wiping is conducted.

Figure 4:
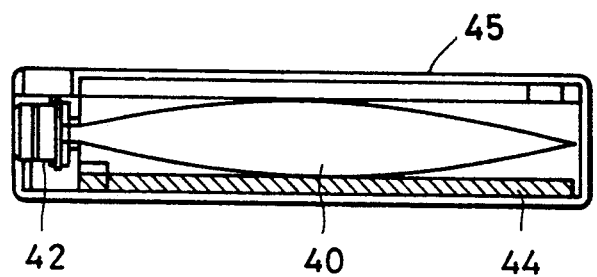
FIG. 4 is a cross-sectional illustration of an ink cartridge.

FIG. 4 illustrates an example of the ink cartridge containing ink to be supplied through an ink supplying member such as a tube. The ink container portion 40, for example an ink bag, contains an ink to be supplied, and has a rubber plug 42 at the tip. By inserting a needle (not shown in the drawings) into the plug 42, the ink in the ink bag 40 becomes accessible. An ink absorption member 44 absorbs waste ink.

The ink container portion has preferably a liquid-contacting face made of polyolefin, especially polyethylene in the present invention.

The ink-jet recording apparatus used in the present invention is not limited to the above-mentioned one which has separately a head and an ink cartridge. Integration thereof as shown in FIG. 5 may suitably be used.

Figure 5:
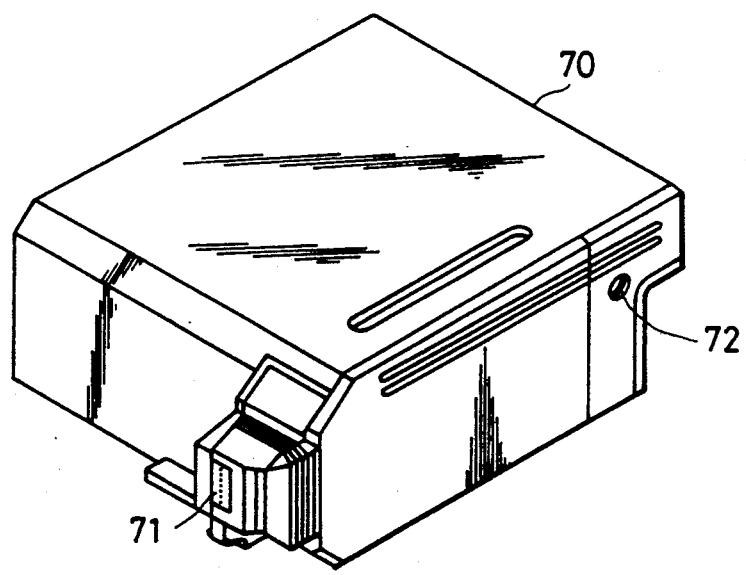
FIG. 5 is a perspective illustration of a recording device.

In FIG. 5, a recording device 70 houses an ink container portion such as an ink absorption member, and the ink in the ink absorption member is ejected from a head 71 having a plurality of orifices. The material for the ink absorption member is preferably polyurethane in the present invention.

Air-communication opening 72 is provided to communicate the interior of the cartridge with the open air.

The recording device 70 may be used in place of the recording head shown in FIG. 3, and is readily mountable to and demountable from the carriage 66.

The present invention is described in more detail referring to examples and comparative examples. The unit "%" in the description is based on weight unless otherwise mentioned.

EXAMPLE

Inks according to the present invention were formed as shown in Table 1, each ink containing one of the compounds illustrated above.

TABLE 1

| Example 1 | |
|---|---|
| Glycerin | 15 parts |
| 2-pyrrolidone | 10 parts |
| Pure water | 71 parts |
| Compound No. 1 (M = Na) | 4 parts |
| Example 2 | |
| Triethylene glycol | 15 parts |
| Pure water | 80 parts |
| Compound No. 3 (M = $NH_4$) | 5 parts |
| Example 3 | |
| Ethylene glycol | 25 parts |
| Ethylene glycol monomethyl ether | 10 parts |
| Pure water | 60 parts |
| Compound No. 4 (M = Li) | 5 parts |
| Example 4 | |
| Diethylene glycol | 15 parts |
| Ethylene glycol monomethyl ether | 5 parts |
| Pure water | 76 parts |
| Compound No. 2 (M = $NH(CH_2CH_2OH)_3$) | 4 parts |
| Example 5 | |
| Triethylene glycol | 15 parts |
| N-methyl-2-pyrrolidine | 5 parts |
| Pure water | 77 parts |
| Compound No. 5 (M = K) | 3 parts |
| Example 6 | |
| Glycerin | 10 parts |
| Thiodiglycol | 10 parts |

TABLE 1-continued

| Pure water | 76 parts |
|---|---|
| Compound No. 6 (M = $N(CH_3)_4$) | 4 parts |

Solid images were recorded with different inks according to the examples 1 to 6 by a recording apparatus (CANON, Bubble Jet Printer BJ-130). The recording apparatus comprises an on-demand type multi-head in which thermal energy is applied to the ink contained in the recording head so as to form droplets for recording. The paper sheets used for the recording were paper recommended for CANON NP-6150, Nuesiedler paper and Prover Bond paper. The recorded paper sheets were cut into pieces of 10×20 mm. The optical densities of the recorded images on the pieces were in the range from 1.30 to 1.45.

Further, the following characteristics $T_1$-$T_5$ of the inks of examples 1-6 were investigated.

($T_1$) Long-term stability: Samples of the ink, sealed in glass bags, were stored for 6 months at temperatures of 0° C. and 40° C.

($T_2$) Discharge stability: The discharge was conducted continuously for 24 hours.

($T_3$) Discharge responsiveness: The discharge was conducted at intervals of 2 seconds, and also conducted after one month's standing of a sample of the ink.

($T_4$) Light resistance: The recorded Prover Bond paper were cut into pieces of 10×20 mm. Percentages of decrease in the optical density of the recorded image on a piece were measured, after 100 hours' exposure to light. The evaluation standards are as follows:
I: within 9%
II: between 10% and 14%
III: between 15% and 25%
IV: 26% or more ($T_5$) Water resistance: The recorded Neusiedler paper were cut into pieces of 10×20 mm. Percentages of decrease in the optical density of the recorded image on a piece were measured, after 3 hours, immersion in water (20° C.). The evaluation standards are as follows:
I within 9%
II: between 10% and 14%
III: between 15% and 25%
IV: 26% or more The results are shown in Table 4.

COMPARATIVE EXAMPLES

For comparison, inks having compositions as shown in Table 2 were formed. Instead of the compounds contained in inks according to the present invention, the inks of the comparative examples contained compounds shown in Table 3, which have more sulfonic acid groups than carboxyl groups. The characteristics $T_1$-$T_5$ of the inks of comparative examples 1-3 were investigated in the same procedure as in the above examples. The results are shown in Table 4.

TABLE 2

| Comparative Example 1 | |
|---|---|
| Glycerin | 15 parts |
| 2-pyrrolidone | 10 parts |
| Pure water | 71 parts |
| Compound No. 1 in Table 3 (M = Na) | 4 parts |
| Comparative Example 2 | |
| Triethylene glycol | 15 parts |
| Pure water | 80 parts |
| Compound No. 2 in Table 3 (M = $NH_4$) | 5 parts |
| Comparative Example 3 | |

TABLE 2-continued

| | |
|---|---|
| Ethylene glycol | 25 parts |
| Ethylene glycol monomethyl ether | 10 parts |
| Pure water | 60 parts |
| Compound No. 3 in Table 3 (M = Li) | 5 parts |

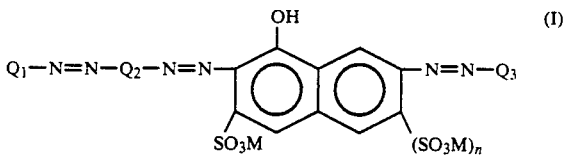

TABLE 3

(Comparative Compound No. 1)

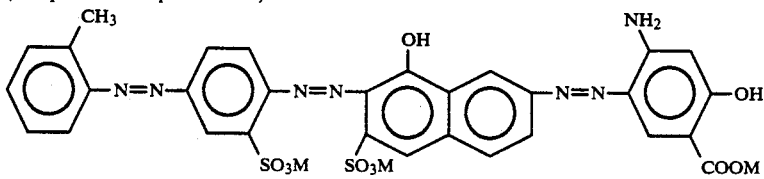

(Comparative Compound No. 2)

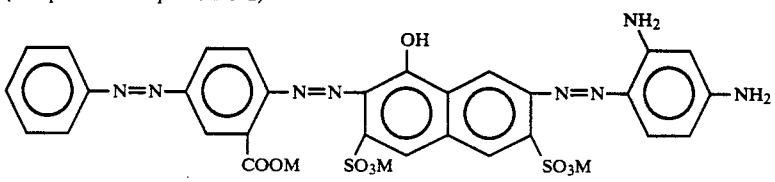

(Comparative Compound No. 3)

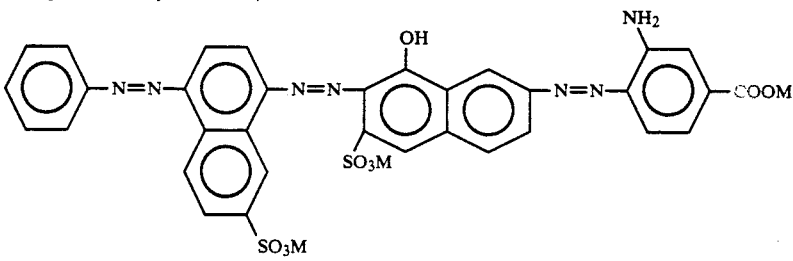

TABLE 4

| | Example | | | | | | Comparative Example | | |
|---|---|---|---|---|---|---|---|---|---|
| | 1 | 2 | 3 | 4 | 5 | 6 | 1 | 2 | 3 |
| T1 | Neither insoluble matter not charge in physical properties including color was observed. | | | | | | | | |
| T2 | High quality recording was able to be performed stably from the beginning to the end. | | | | | | | | |
| T3 | In either case, there was no clogging at the orifice tip, and recording was effected stably and uniformly. | | | | | | | | |
| T4 | I | I | I | I | I | I | II | II | III |
| T5 | I | I | II | I | I | I | IV | IV | IV |

As understood from the above description, an ink according to the present invention produces highly water-resisting images even on ordinary paper since the ink contains a specific compound as a coloring material.

While the present invention has been described with respect to what is presently considered to be the preferred embodiments, it is to be understand that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink comprising: water, a water soluble organic solvent, and a colorant represented by the following general formula (I):

wherein $Q_1$ is a substituted phenyl group $Q_2$ is a substituted or unsubstituted p-phenylene or a substituted or unsubstituted 1,4-naphthylene group; $Q_3$ is a substituted phenyl group; M is an alkali metal, ammonium or an organic ammonium; and n is 0 or 1, and wherein said colorant has at least s sulfonic acid group and a carboxyl group and the number of said sulfonic acid groups is not greater than the number of said carboxyl groups.

2. An ink according to claim 1, wherein $Q_1$ is a phenyl group substituted by at least one substituent selected from the group consisting of $-NH_2$, $-CH_3$, $-OH$, $-Cl$, $-SO_3M$ and $-COOM$; $Q_2$ is a p-phenylene or 1,4-napthylene group substituted with at least one substituent selected from the group consisting of $-CH_3$, $-OCH_3$, $-NHCOCH_3$, $-COOM$ and $-SO_3M$; and $Q_3$ is a phenyl group substituted with at least one substituent selected from the group consisting of $-NH_2$, $-CH_3$, $-OH$, $-SO_3M$ and $-COOM$.

3. An ink according to claim 1, wherein the ink contains the compound represented by the general formula (I) in an amount of from 0.2 to 20% by weight based on the total weight of the ink.

4. An ink according to claim 1, wherein the ink contains the water soluble organic solvent in an amount of from 2 to 50% by weight based on the total weight of the ink.

5. An ink according to claim 1, wherein the ink contains the water in an amount of from 50 to 95% by weight based on the total weight of the ink.

6. An ink jet recording process comprising the step of: conducting recording by ejecting droplets of an ink from an orifice in response to a recording signal, the ink comprising: water, a water soluble organic solvent, and a colorant represented by the following general formula (I):

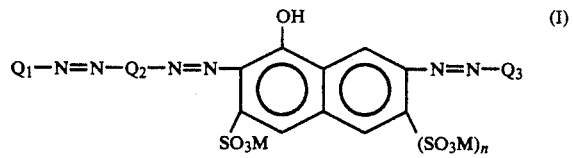

wherein $Q_1$ is a substituted phenyl group; $Q_2$ is a substituted or unsubstituted p-phenylene or a substituted or unsubstituted 1,4-napthylene group; $Q_3$ is a substituted phenyl group; M is an alkali metal, ammonium or an organic ammonium; and n is 0 or 1, and wherein said and a carboxyl group and the number of said sulfonic acid groups is not greater than the number of said carboxyl groups.

7. An ink jet recording process according to claim 6, wherein $Q_1$ is a phenyl group substituted by at least one substituent selected from the group consisting of $-NH_2$, $-CH_3$, $-OH$, $-Cl$, $-SO_3M$ and $-COOM$; $Q_2$ is a p-phenylene or 1,4-napthylene group substituted with at least one substituent selected from the group consisting of $-CH_3$, $-OCH_3$, $-NHCOCH_3$, $-COOM$ and $-SO_3M$; and $Q_3$ is a phenyl group substituted with at least one substituent selected from the group consisting of $-NH_2$, $-CH_3$, $-OH$, $-SO_3M$ and $-COM$.

8. An ink jet recording process according to claim 6, wherein the droplets of the ink are ejected by action of thermal energy.

9. An ink jet recording process according to claim 6, wherein the ink contains the compound represented by the general formula (I) in an amount of from 0.2 to 20% by weight based on the total weight of the ink.

10. An ink jet recording process according to claim 6, wherein the ink contains the water soluble organic solvent in an amount of from 2 to 50% weight based on the total weight of the ink.

11. An ink jet device comprising an ink storing member impregnated with a recording liquid, and a head having an orifice for ejecting the recording liquid as droplets, the recording liquid comprising an ink comprising: water, a water soluble organic solvent, and a colorant represented by the following general formula (I):

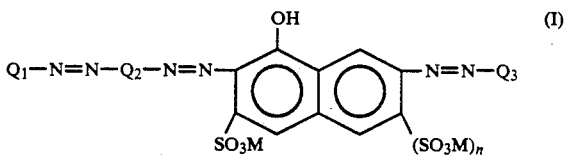

wherein $Q_1$ is a substituted phenyl group; $Q_2$ is a substituted or unsubstituted p-phenylene or a substituted or unsubstituted 1,4-napthylene group; $Q_3$ is a substituted phenyl group; M is an alkali metal, ammonium or an organic ammonium; and n is 0 or 1, and wherein said colorant has at least a sulfonic acid group and a carboxyl group and the number of said sulfonic acid groups is into greater than the number of said carboxyl groups.

12. An ink jet device according to claim 11, wherein $Q_1$ is a phenyl group substituted by at least on substituent selected from the group consisting of $-NH_2$, $-CH_3$, $-OH$, $-Cl$, $-SO_3M$ and $-COOM$; $Q_2$ is a p-phenylene or 1,4-napthylene group substituted with at least one substituent selected from the group consisting of $-CH_3$, $-OCH_3$, $-NHCOCH_3$, $-COOM$ and $-SO_3M$; and $Q_3$ is a phenyl group substituted with at least one substituent selected from the group consisting of $-NH_2$, $-CH_3$, $-OH$, $-SO_3M$ and $-COOM$.

13. An ink jet device according to claim 11, wherein the ink storing member is an ink absorber or an ink bag.

14. An ink jet device according to claim 11, wherein the head has a heating head to give to the ink a heat energy for ejecting ink droplets.

15. An ink jet device according to claim 11, wherein the ink contains the compound represented by the general formula (I) in an amount of from 0.2 to 20% by weight based on the total weight of the ink.

16. An ink jet device according to claim 11, wherein the ink contains the water soluble organic solvent in an amount of from 2 to 50% by weight based on the total weight of the ink.

17. An ink jet device according to claim 11, wherein the ink contains the water in an amount of from 50 to 95% by weight based on the total weight of the ink.

18. An ink jet recording apparatus comprising an ink jet device comprising an ink storing member impregnated with a recording liquid, and a head having an orifice for ejecting the recording liquid as droplets, the recording liquid comprising an ink comprising: water, a water soluble organic solvent, and a colorant represented by the following general formula (I):

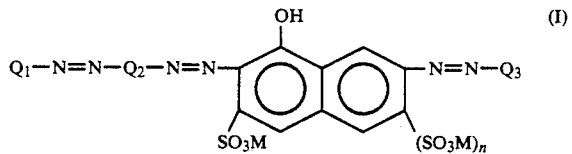

wherein $Q_1$ is a substituted phenyl group; $Q_2$ is a substituted or unsubstituted p-phenylene or a substituted or unsubstituted 1,4-napthylene group; $Q_3$ is a substituted phenol group; M is an alkali metal, ammonium or an organic ammonium; and n is 0 or 1, and wherein said colorant has at least a sulfonic acid group and a carboxyl group and the number of said sulfonic acid groups is not greater than the number of said carboxyl groups.

19. An ink jet recording apparatus according to claim 18, wherein $Q_1$ is a phenyl group substituted by at least one substituent selected from the group consisting of $-NH_2$, $-CH_{23}$, $-OH$, $-Cl$, $-SO_3M$ and $-COOM$; $Q_2$ is a p-phenylene or 1,4-napthylene group substituted with at least one substituent selected from the group consisting of $-CH_3$, $-OCH_3$, $-NHCOCH_3$, $-COOM$ and $-SO_3M$; and $Q_3$ is a phenyl group substituted with at least one substituent selected from the group consisting of $-NH_2$, $-CH_3$, $-OH$, $-SO_3M$ and $-COOM$.

20. An ink jet recording apparatus according to claim 18, wherein the ink storing member is an ink absorber or an ink bag.

21. An ink jet recording apparatus according to claim 18, wherein the head has a heating head to provide a heat energy to the ink for ejecting ink droplets.

22. An ink jet recording apparatus according to claim 18, wherein the ink contains the compound represented by the general formula (I) in an amount of from 0.2 to 20% by weight based on the total weight of the ink.

23. An ink jet recording apparatus according to claim 18, wherein the ink contains the water soluble organic solvent in ana mount of from 2 to 50% weight based on the total weight of the ink.

24. An ink jet recording apparatus according to claim 18, wherein the ink contains the water in an amount of from 50 to 95% by weight based on the total weight of the ink.

25. An ink cartridge comprising an ink bag impregnated with a recording liquid comprising an ink comprising: water, a water soluble organic solvent, and a colorant represented by the following general formula (I):

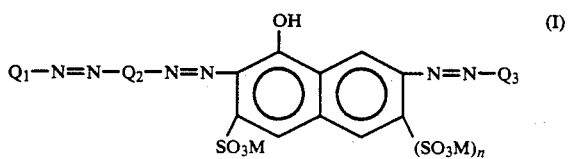

wherein $Q_1$ is a substituted phenyl group; $Q_2$ is a substituted or unsubstituted p-phenylene or a substituted or unsubstituted 1,4-napthylene group; $Q_3$ is a substituted phenyl group; M is an alkali metal, ammonium or an organic ammonium; and n is 0 or 1, and wherein aid colorant has at least a sulfonic acid group and a carboxyl group and the number of said sulfonic acid groups is into greater than the number of said carboxyl groups.

26. An ink cartridge according to claim 25, wherein $Q_1$ is a phenyl group substituted by at least one substituent selected from the group consisting of $-NH_2$, $-CH_3$, $-OH$, $-Cl$, $-SO_3M$ and $-COOM$; $Q_2$ is a p-phenylene or 1,4-napthylene group substituted with at least one substituent selected from the group consisting of $-CH_3$, $-OCH_3$, $-NHCOCH_3$, $-COOM$ and $-SO_3M$; and $Q_3$ is a phenyl group substituted with at least one substituent selected from the group consisting of $-NH_2$, $-CH_3$, $-OH$, $-SO_3M$ and $-COOM$.

27. An ink cartridge according to claim 25, wherein the ink contains the compound represented by the general formula (I) in an amount of from 0.2 to 20% by weight based on the total weight of the ink.

28. An ink cartridge according to claim 25, wherein the ink contains the water soluble organic solvent in an amount of from 2 to 50% by weight based on the total weight of the ink.

29. An ink cartridge according to claim 25, wherein the ink contains the water in an amount of from 50 to 95% by weight based on the total weight of the ink.

* * * * *

UNITED STATES PATENT AND TRADEMARK OFFICE
CERTIFICATE OF CORRECTION

PATENT NO. : 5,213,614    Page 1 of 3
DATED : May 25, 1993
INVENTOR(S) : Eida et al.

It is certified that error appears in the above-indentified patent and that said Letters Patent is hereby corrected as shown below:

[57] ABSTRACT:

Line 5, "Q1" should read --$Q_1$--; and "Q2" should read --$Q_2$--; and
Line 7, "1,4-naphtylene" should read --1,4-naphthylene--; and "Q3" should read --$Q_3$--.

COLUMN 1:

Line 11, "ian" should read --an--;
Line 13, "description" should read --Description--;
Line 16, "studies" should read --studied--;
Line 48, "1,4-napthylene" should read --1,4-naphthylene--; and
Line 50, "is," should read --is--.

COLUMN 2:

Line 48, "Q1" should read --$Q_1$--;
Line 49, "Cl,SO3M" should read --Cl, $SO_3M$--;
Line 52, "Q2" should read --$Q_2$--;
Line 54, "SO3M;" should read --$SO_3M$;--; and
Line 57, "$CH_2$," should read --$NH_2$, $CH_3$,--.

COLUMN 4:

Line 58, "tetraetylene" should read --tetraethylene--.

UNITED STATES PATENT AND TRADEMARK OFFICE
CERTIFICATE OF CORRECTION

PATENT NO. : 5,213,614
DATED : May 25, 1993
INVENTOR(S) : Eida et al.

It is certified that error appears in the above-indentified patent and that said Letters Patent is hereby corrected as shown below:

COLUMN 7:

Line 40, "EXAMPLE" should read --EXAMPLES--.

COLUMN 8:

Line 40, "hours," should read --hours'--; and
   Line 42, "I" should read --I:--.

COLUMN 9:

Table 4, "not charge" should read --nor change--.

COLUMN 10:

Line 40, "group" should read --group;--;
   Line 45, "s" should read --a--; and
   Line 52, "1,4-napthylene" should read --1,4-naphthylene--.

COLUMN 11:

Line 19, "said" should read --said colorant has at least
    a sulfonic acid group--;
   Line 27, "1,4-napthylene" should read --1,4-naphthylene--;
   Line 33, " -COM." should read --COOM.--;
   Line 63, "1,4-napthylene" should read --1,4-naphthylene--;
    and
   Line 68, "into" should read --not--.

UNITED STATES PATENT AND TRADEMARK OFFICE
CERTIFICATE OF CORRECTION

PATENT NO. : 5,213,614
DATED : May 25, 1993
INVENTOR(S) : Eida et al.

It is certified that error appears in the above-indentified patent and that said Letters Patent is hereby corrected as shown below:

COLUMN 12:

Line 2, "on" should read --one--;
Line 5, "1,4-napthylene" should read --1,4-naphthylene--;
Line 45, "1,4-napthylene" should read --1,4-naphthylene--;
Line 46, "phenol" should read --phenyl--;
Line 54, "$CH_{23}$," should read --$CH_3$,--; and
Line 55, "1,4-napthylene" should read --1,4-naphthylene--.

COLUMN 13:

Line 7, "ana mount" should read --an amount--; and "weight" should read --by weight--; and
Line 28, "1,4-napthylene" should read --1,4-naphthylene--.

COLUMN 14:

Line 2, "aid" should read --said--;
Line 5, "into" should read --not--; and
Line 10, "1,4-napthylene" should read --1,4-naphthylene--.

Signed and Sealed this

Twenty-second Day of March, 1994

Attest:

BRUCE LEHMAN

*Attesting Officer*  *Commissioner of Patents and Trademarks*